United States Patent [19]

Mentz et al.

[11] Patent Number: 5,167,905
[45] Date of Patent: Dec. 1, 1992

[54] FOLDABLE NOZZLE DAM HAVING A FOLDABLE EXTRUSION-RESISTANT SEAL OR GASKET

[75] Inventors: Raymond M. Mentz, Monroeville; Charles D. Hanna, Penn Township, both of Pa.

[73] Assignee: Westinghouse Electric Corp., Pittsburgh, Pa.

[21] Appl. No.: 763,385

[22] Filed: Sep. 20, 1991

[51] Int. Cl.$^5$ .............................................. G21C 13/00
[52] U.S. Cl. ................................... 376/204; 376/203; 376/205
[58] Field of Search .................. 376/203, 204, 205; 220/232; 138/89, 93; 277/22, 34

[56] References Cited

U.S. PATENT DOCUMENTS

| | | | |
|---|---|---|---|
| 3,815,864 | 6/1974 | Loeber | 249/179 |
| 3,986,721 | 10/1976 | Decker | 277/166 |
| 4,040,636 | 8/1977 | Albertson et al. | 277/188 |
| 4,079,701 | 3/1978 | Hickman et al. | 122/382 |
| 4,181,313 | 1/1980 | Hillier et al. | 277/166 |
| 4,468,042 | 8/1984 | Pippert et al. | 277/188 |
| 4,591,477 | 5/1986 | Rettew | 376/204 |
| 4,625,979 | 12/1986 | Inciong | 277/180 |
| 4,637,588 | 1/1987 | Wilhelm et al. | 251/280 |
| 4,671,326 | 6/1987 | Wilhelm et al. | 138/89 |
| 4,690,172 | 9/1987 | Everett | 138/89 |
| 4,720,113 | 1/1988 | Hertz, Jr. | 277/165 |
| 4,749,201 | 6/1988 | Hunger | 277/165 |
| 4,770,235 | 9/1988 | Rogers, Jr. et al. | 165/76 |
| 4,860,919 | 8/1989 | Weisel et al. | 220/240 |
| 4,957,215 | 9/1990 | Evans et al. | 220/232 |

OTHER PUBLICATIONS

Copending U.S. Patent Application Ser. No. 07/618,127 entitled Steam Generator Nozzle Dam filed Nov. 26, 1990, in the name of William C. Ritz et al.

Primary Examiner—Brooks H. Hunt
Assistant Examiner—Meena Chelliah
Attorney, Agent, or Firm—Walter S. Stevens

[57] ABSTRACT

Apparatus for sealing or blocking conduits, such as the primary nozzles of a nuclear steam generator. The invention includes an annular bracket sealingly attached to the rim of the open end of the nozzle, the bracket having a plurality of threaded holes therein. Mounted atop the bracket is a generally circular nozzle dam that includes a first side section hingedly pivotably connected to a second side section for allowing the nozzle dam to be foldable. Removably connected to each side section is a center section, the center section and the side sections defining the generally circular nozzle dam for covering the opening defined by the annular bracket. The periphery portions of the center section and of the side sections have bores therethrough. A plurality of threaded bolts extend through the bores in the nozzle dam and into the threaded holes in the bracket for removably bolting the nozzle dam to the bracket. Interposed between the nozzle dam and the bracket is an elastomeric extrusion-resistant seal member having a plurality of apertures through the periphery thereof for receiving each bolt. As the nozzle dam is bolted to the bracket, a compressive force will act perpendicularly on the seal member. This compressive force will tend to cause the apertures of the seal member to extrude laterally outwardly away from each bolt, thus enlarging the aperture surrounding each bolt. Thus, the seal member is configured to effectively seal an imperfect seal surface and to resist extrusion such as by having laminated layers of differing hardnesses, so that the seal member will not laterally extrude away from each bolt in a manner that enlarges the aperture surrounding each bolt as the nozzle dam is tightly bolted to the bracket. The extrusion-resistant feature of the seal member provides a nozzle dam that is fluid-tight because the aperture is not enlarged.

27 Claims, 11 Drawing Sheets

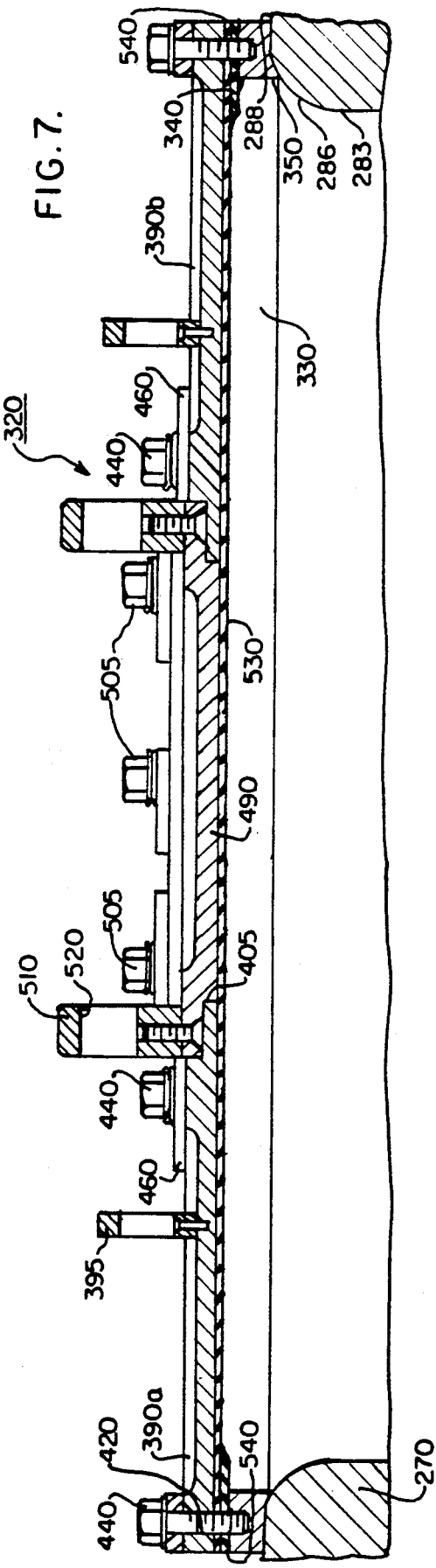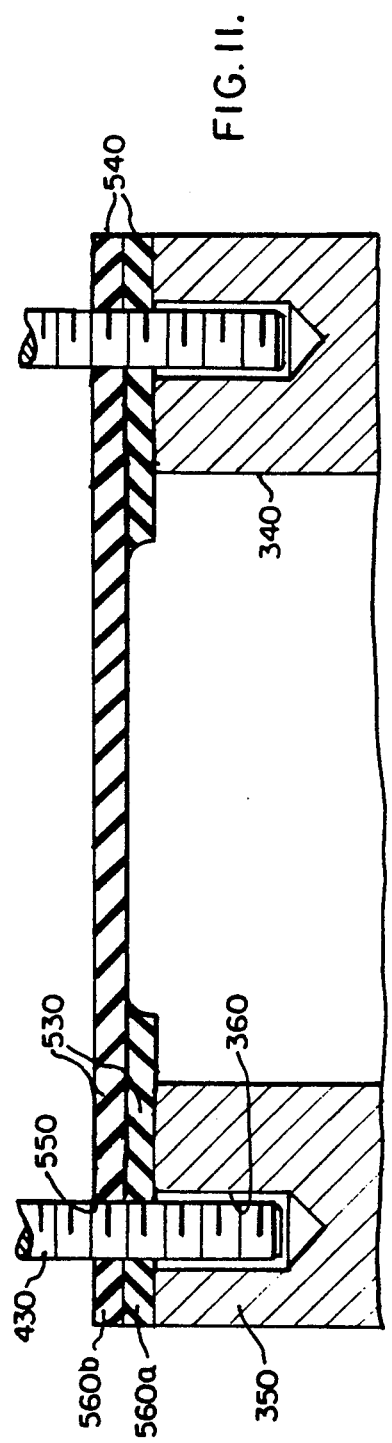

FOLDABLE NOZZLE DAM HAVING A FOLDABLE EXTRUSION-RESISTANT SEAL OR GASKET

BACKGROUND OF THE INVENTION

This invention generally relates to apparatus for sealing conduits and more particularly relates to a foldable nozzle dam having a foldable extrusion-resistant seal or gasket for sealing conduits, such as the primary nozzles of a nuclear steam generator.

Before discussing the current state of the art, it is instructive first to briefly describe the structure and operation of a typical nuclear steam generator. In this regard, a typical nuclear steam generator generally comprises a shell and a plurality of U-shaped heat transfer tubes disposed in the shell, the U-shape of the tubes defining a first tube leg portion and a second tube leg portion interconnected by a U-bend tube portion. The shell defines an inlet plenum and an outlet plenum therein such that the first tube leg portion of each U-shaped tube is in fluid communication with the inlet plenum and the second tube leg portion of each tube is in fluid communication with the outlet plenum. Also in fluid communication with the inlet plenum is an inlet primary nozzle attached to the shell for delivering a radioactive primary fluid into the inlet plenum. Moreover, in fluid communication with the outlet plenum is an outlet primary nozzle attached to the shell for allowing the primary fluid to exit the outlet plenum and thus exit the steam generator in the manner discussed hereinbelow. In addition, the steam generator shell also includes a plurality of relatively small diameter manway openings therethrough for allowing access to the inlet and outlet plena so that maintenance can be performed in the steam generator. In this typical nuclear steam generator, each manway opening has a diameter substantially less than the inside diameters of the inlet and outlet nozzles.

During operation of the nuclear steam generator, the radioactive primary fluid, which is heated by the fission reaction of a nuclear reactor core, flows through the tubes as a nonradioactive secondary fluid of lower temperature circulates around the tubes. More specifically, the primary fluid flows from the nuclear reactor core where it is heated, through the inlet nozzle and into the inlet plenum. The primary fluid then flows into the first tube leg portion of each heat transfer tube, through the U-bend portion of each tube, out the second tube leg portion of each tube and then into the outlet plenum, whereupon it exits the outlet nozzle and the steam generator. Moreover, as the primary fluid exits the steam generator, it is returned to the nuclear reactor core to be reheated. Of course, as the primary fluid flows through the heat transfer tubes, it gives up its heat to the secondary fluid circulating around the tubes for producing steam in a manner well known in the art. Such a typical nuclear steam generator is more fully disclosed in U.S. Pat. No. 4,079,701 entitled "Steam Generator Sludge Removal System" issued Mar. 21, 1978 to Robert A. Hickman et al.

Periodically, it is necessary to shut down the nuclear reactor core for refueling. At that time, it is cost advantageous also to simultaneously perform maintenance on the steam generator. During such maintenance activities, a reactor cavity, which encloses a reactor vessel containing the reactor core, is partially drained of primary fluid to a level that is below the elevation of the inlet and outlet nozzles of the steam generator. Of course, for safety reasons the nuclear reactor core is not uncovered when the reactor cavity is partially drained of primary fluid. Thus, it will be appreciated that this process of partially draining the reactor cavity to an elevation that is below the inlet and outlet nozzles of the steam generator also drains the heat transfer tubes as well as the inlet and outlet plena of the steam generator. After the steam generator tubes and the inlet and outlet plena are drained of primary fluid, nozzle dams are inserted through the relatively small diameter manways and installed in the mouths of the inlet and outlet nozzles to block the nozzles. Once these dams are installed, the reactor cavity can be refilled with primary fluid for the refueling operation, the reactor cavity being refilled to a level above the elevation of the inlet and outlet plena. Therefore, refilling of the reactor cavity with primary fluid can be accomplished without interfering with maintenance activities being performed in the steam generator plena because the nozzle dams which block the inlet and outlet nozzles prevent the radioactive primary fluid from rising into the inlet and outlet plena. Moreover, simultaneously performing reactor refueling and steam generator maintenance activities reduces the total time the nuclear reactor core is shut down, thereby recapturing revenue that would otherwise be lost when reactor refueling and steam generator maintenance are performed in seriatim. In addition, as stated hereinabove, the manway openings have a diameter smaller than the inside diameter of the inlet and outlet nozzles. Therefore, a problem in the art is to provide a nozzle dam that is not only capable of passing through the relatively small diameter manways but also capable of being disposed across the relatively larger inside diameters of the inlet and outlet nozzles to block the nozzles.

Of course, once installed across the inlet or outlet nozzle, the nozzle dam should be fluid-tight so that primary fluid will not rise into the inlet and outlet plena to interfere with maintenance activities being performed in the steam generator. In this regard, the nozzle dam may include at least two parts sized to pass through the inlet or outlet nozzle, the two parts having a seal or gasket therebetween to seal the nozzle dam so that the nozzle dam is fluid-tight. The seal or gasket, which is intended to be clamped between the two parts for creating a seal therebetween, may have at least one aperture for passage of clamping means therethrough. However, applicants have observed that the aperture of the seal or gasket may extrude away from the clamping means when the two parts are tightly clamped together, thus enlarging the fluid flow path defined by the aperture surrounding the clamping means. This is undesirable because such enlargement of the flow path compromises the ability of the seal or gasket to perform its intended function of providing a nozzle dam that is fluid-tight. Therefore, another problem in the art is to provide a nozzle dam having a seal or gasket that resists extrusion away from such clamping means so that the nozzle dam is fluid-tight.

Steam generator nozzle dams having seals are known. One such nozzle dam is disclosed in U.S. Pat. No. 4,637,588 entitled "Non-Bolted Ringless Nozzle Dam" issued Jan. 20, 1987 in the name of John J. Wilhelm et al. and assigned to the assignee of the present invention. This patent discloses a nozzle dam having one or more seal assemblies, each seal assembly including a foldable circular seal plate encircled with an inflatable seal which is disposable in frictional engagement with the nozzle wall. However, this patent does not appear to disclose a nozzle dam having an extrusion-resistant seal or gasket.

Another nozzle dam having a seal assembly is disclosed in U.S. Pat. No. 4,671,326 entitled "Dual Seal Nozzle Dam and Alignment Means Therefore" issued Jun. 9, 1987 in the name of John J. Wilhelm et al. and assigned to the assignee of the present invention. This patent discloses a seal assembly including a foldable circular seal plate having a center section hingedly connected to two side sections. However, this patent does not appear to disclose a nozzle dam having an extrusion-resistant seal or gasket.

An extrusion-limiting seal or gasket is disclosed in U.S. Pat. No. 4,181,313 entitled "Seals And Gaskets" issued Jan. 1, 1980 in the name of Edward F. H. B. Hillier et al. According to this patent, a seal or gasket, which has at least one aperture providing a fluid passageway and which is intended in use to be clamped by clamping means between surfaces of two parts to be sealed, comprises an elastically-compressible material and a relatively-incompressible material bonded therein, the relatively-incompressible material forming an extrusion-limiting barrier which extends at least partway around the aperture. However, this patent does not appear to disclose a foldable nozzle dam having a foldable extrusion-resistant seal or gasket.

An anti-extrusion sealing device is disclosed in U.S. Pat. No. 4,468,042 entitled "Anti-Extrusion Sealing Device With Interlocked Retainer Portions" issued Aug. 28, 1984 in the name of Aaron J. Pippert et al. According to this patent, a relatively soft body, including a sealing portion, and a harder body, which serves as an anti-extrusion device for the soft body, are permanently joined together by mating mechanical interlock formations. However, this patent does not appear to disclose a foldable nozzle dam having a foldable extrusion-resistant seal or gasket.

Thus, although the above-recited patents may disclose nozzle dams and anti-extrusion seal devices, these patents do not appear to disclose a foldable nozzle dam having a foldable extrusion-resistant seal or gasket, the nozzle dam being foldable for passing through the relatively small diameter steam generator manway and being unfoldable for placement across the larger diameter of the nozzle in combination with a foldable seal or gasket attached to the nozzle dam, the seal or gasket being extrusion-resistant for providing a nozzle dam that is fluid-tight.

Therefore, what is needed is a foldable nozzle dam having a foldable extrusion-resistant seal or gasket for sealing conduits, such as the primary nozzles of a nuclear steam generator.

SUMMARY OF THE INVENTION

A typical nuclear power plant includes a nuclear reactor core for producing heat and a steam generator in fluid communication with the nuclear reactor core for generating steam. The steam generator includes inlet and outlet primary nozzles attached to the steam generator. At times it is necessary to perform maintenance in the steam generator. To safely and satisfactorily perform this maintenance, it is prudent first to seal or block the inlet and outlet primary nozzles of the steam generator.

Therefore, disclosed herein is an apparatus for sealing or blocking conduits, such as the primary nozzles of a nuclear steam generator. In general, the apparatus comprises an annular bracket surrounding the open end of the conduit, the bracket having a circular opening transversely therethrough and a top surface thereon and having a periphery portion sealingly attached to the open end of the conduit, the periphery portion having a plurality of spaced-apart holes transversely therein; a cover plate mounted on the bracket for covering the opening of the bracket, the cover plate having a periphery portion having a plurality of spaced-apart bores transversely therethrough; a plurality of elongated fasteners engaging the holes of the bracket and the bores of the cover plate for tightly connecting the cover plate to the bracket; and extrusion-resistant seal means interposed between the bracket and the cover plate for providing a fluid-tight seal therebetween, the seal means having a periphery portion having a plurality of spaced-apart transverse apertures for receiving the fasteners therethrough, the seal means intimately engaging the top surface of the bracket for providing a fluid-tight seal between the cover plate and the bracket, the seal means being configured to resist extrusion away from the fasteners as the cover plate is tightly connected to the bracket.

More specifically, the invention comprises an annular bracket sealingly attached to the rim of the open end of the primary nozzle, the bracket having a plurality of threaded holes therein. Mounted atop the bracket is a foldable nozzle dam that includes a generally arcuate-shaped first side section hingedly connected to a generally arcuate-shaped second side section. Each arcuate-shaped side section includes a cut-out centrally formed along the straight portion thereof, the cut-outs defining a generally rectangular opening when the hinged side sections are moved into the same plane with respect to each other. Covering the rectangular opening and removably connected to each side section is a generally rectangular center section. When the side sections are moved into the same plane with respect to each other and when the center section is connected to the side sections, the center section and the side sections define a nozzle dam having a generally circular configuration for covering the circular opening defined by the bracket. The periphery portions of the center section and of the side sections have bores therethrough capable of being coaxially aligned with the threaded holes in the bracket. A plurality of threaded bolts extend through the bores in the nozzle dam and into the threaded holes in the bracket for removably connecting the nozzle dam to the bracket.

Interposed between the nozzle dam and the bracket is an elastomeric foldable extrusion-resistant seal member for providing a seal therebetween so that the primary nozzle may be suitably sealed. The periphery of the seal member has a plurality of apertures for receiving each bolt therethrough. The seal member is attached, such as by contact cement, to the side sections of the nozzle dam. In one embodiment of the seal member, the seal member comprises in transverse section a plurality of layers bonded or laminated together, such as by a suitable adhesive. In this embodiment of the seal member, a generally annular first layer is sealingly attached to the bottom of a generally circular second layer. The first layer has an outside diameter that is substantially the same as the outside diameter of the nozzle dam. The second layer has a diameter that is also substantially the same as the outside diameter of the nozzle dam and covers the full surface of the nozzle dam. The first layer is of a material that is softer than the second layer. In this regard, the first layer may be EPDM (ethylene propylene diene monomer) rubber having a Shore A durometer hardness of between 40 and 60. The second layer may be EPDM rubber having a Shore A durometer hardness of between 60 and 80. The dual hardness of the seal member allows it to be extrusion-resistant and also allows it to intimately engage the top surface of the bracket for creating an effective seal between the nozzle dam and the bracket, which nozzle dam and/or bracket may have surface imperfections that could otherwise lead to leakage.

In another embodiment of the seal member, the seal member comprises in transverse section a plurality of regions fused or molded together rather than laminated layers bonded together. In this embodiment of the seal member, a generally annular first region is molded with a generally circular second region. The first region has an outside diameter that is substantially the same as the outside diameter of the nozzle dam. The second region has a diameter that is also substantially the same as the outside diameter of the nozzle dam. The first region is of a material that is softer than the second region. In this regard, the first region may be EPDM rubber having a Shore A durometer hardness of between 40 and 60. The second region may be EPDM rubber having a Shore A durometer hardness of between 60 and 80. The molded configuration of the molded seal member allows it to be mounted on the nozzle dam assembly more easily than the laminated seal member. The molded seal member is formed in a shop-fabricated, press-cure process. The laminated seal member, on the other hand, requires that the annular first layer be formed separately from the second layer. The next step for assembling the laminated seal member is to mat and glue the two layers together. This step for producing the laminated seal member requires that the first layer be precisely matted and glued to the second layer. The gluing operation must result in laminated layers that are not buckled and that do not contain air bubbles therebetween; that is, the laminated layers must be substantially uniformly glued to each other across their entire interface. If the laminated layers are not precisely matted and glued, then the layers must be separated, the gluing removed and the operation repeated. Thus, the laminated seal member requires more labor-intensive assembly steps than the molded seal member and is therefore more costly to produce.

During installation in the primary nozzle, the nozzle dam is drawn toward the bracket as the bolts threadably engage the holes of the bracket. As the nozzle dam is drawn toward the bracket, a compressive force will act perpendicularly on each opposing face or side of the seal member because the seal member is interposed between the nozzle dam and the bracket. This compressive force acting perpendicularly against each side of the seal member will tend to cause the seal member to extrude laterally outwardly away from each bolt. Such lateral extrusion of the seal member as the nozzle dam is tightly clamped or connected to the bracket will tend to enlarge the aperture that defines the annular gap or fluid flow path around each bolt. This is undesirable because creation of such an enlarged flow path will compromise the ability of the seal member to perform its intended function of providing a nozzle dam that is fluid-tight. Thus, according to the invention, the seal member is configured to be extrusion-resistant so that the seal member will not laterally extrude away from each bolt in a manner that adversely enlarges the fluid flow path around each bolt.

An object of the present invention is to provide an apparatus for sealing or blocking the open end of a conduit.

Another object of the present invention is to provide a foldable extrusion-resistant seal or gasket for sealing the primary nozzles of a nuclear steam generator.

A feature of the invention is the provision of an extrusion-resistant laminated seal member having in transverse cross-section a plurality of bonded layers of differing hardnesses.

Another feature of the invention is the provision of an extrusion-resistant molded seal member having in transverse cross-section a plurality of fused or molded regions of differing hardnesses.

An advantage of the invention is that the configuration of the seal member allows it to be extrusion-resistant so that the seal member will not substantially laterally extrude away from bolts passing therethrough so that the fluid flow path surrounding the bolts is not adversely enlarged.

These as well as additional objects, features and advantages of the present invention will become apparent from the following detailed description of the preferred embodiments with reference to the several figures.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

FIG. 7 is a view along section line VII—VII of FIG. 6 showing the nozzle dam installed across the open end of the inlet primary nozzle, the nozzle dam being mounted on the bracket attached to the open end of the inlet primary nozzle;

FIG. 11 is a view in vertical section of the laminated seal or gasket showing the second layer glued or bonded to the first layer, the first and second layers having apertures for receiving the clamping bolts therethrough;

DESCRIPTION OF THE PREFERRED EMBODIMENTS

A typical nuclear power plant includes a nuclear reactor core for producing heat and a steam generator in fluid communication with the nuclear reactor core for generating steam. The steam generator includes inlet and outlet primary nozzles attached to the steam generator. At times it is necessary to perform maintenance in the steam generator. To safely and satisfactorily perform this maintenance, it is prudent first to seal or block the inlet and outlet primary nozzles of the steam generator. Disclosed herein is a foldable nozzle dam having a foldable extrusion-resistant seal or gasket for sealing the primary nozzles of the nuclear steam generator.

Before describing the subject matter of the present invention, it is instructive first to generally describe the structure and operation of a typical nuclear reactor and associated steam generator.

Figure 1:
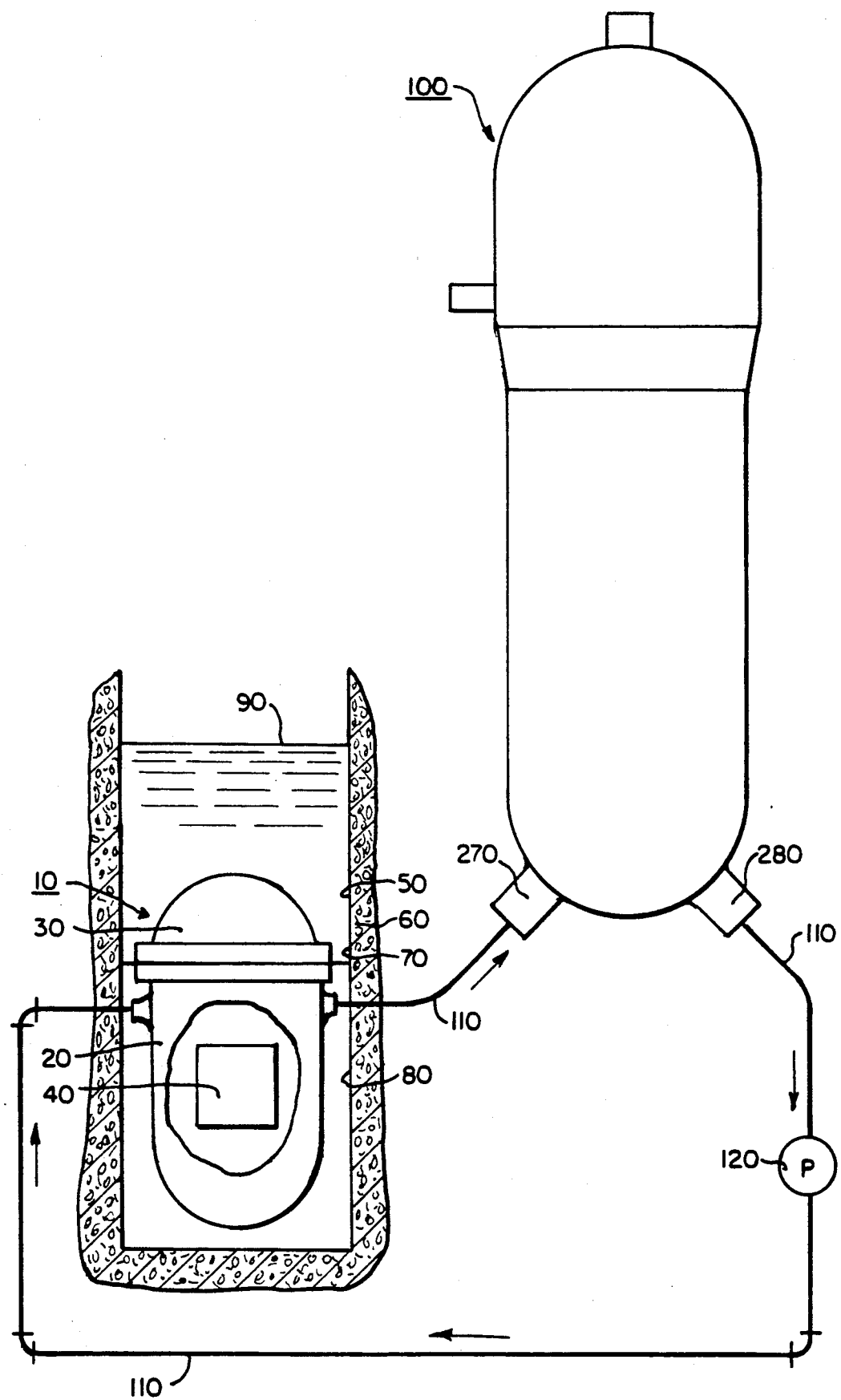
FIG. 1 illustrates a nuclear reactor connected to a steam generator.

Therefore, referring to FIG. 1, there is illustrated a nuclear reactor vessel, generally referred to as 10, having a lower portion 20 and a closure head 30 mounted atop lower portion 20. Lower portion 20 houses a nuclear reactor core 40 for producing heat. Reactor vessel 10 is disposed in a reactor cavity 50 that is defined by a reactor vessel enclosure 60. Reactor cavity 50 is partitioned into an upper cavity portion 70 for enclosing closure head 30 and a lower cavity portion 80 sealingly isolated from upper cavity portion 70 for enclosing lower portion 20. Reactor core 40 is surrounded by a primary fluid (e.g., demineralized borated water) circulating through reactor vessel 10 for removing the heat produced by reactor core 40. In addition, the exterior of closure head 30 is surrounded by a refueling pool 90 (e.g., demineralized borated water) substantially filling upper cavity portion 70 for providing a biological shield so that nuclear radiation from reactor core 40 is attenuated during refueling of reactor core 40. Of course, during refueling operations, closure head 30 is removed from lower portion 20 in a manner well known in the art to provide access to reactor core 40.

Still referring to FIG. 1, a steam generator, generally referred to as 100 is disposed near reactor vessel 10 for generating steam, as described more fully hereinbelow. Interconnecting reactor vessel 10 and steam generator 100 is a pipe 110 that is in fluid communication with the primary fluid surrounding reactor core 40 and through which pipe 110 the primary fluid is pumped, as shown by the direction of the arrows in FIG. 1. In this regard, a reactor coolant pump 120 is interconnected with pipe 110 for pumping the primary fluid through pipe 110, through reactor core 40 and through steam generator 100.

Figure 2:
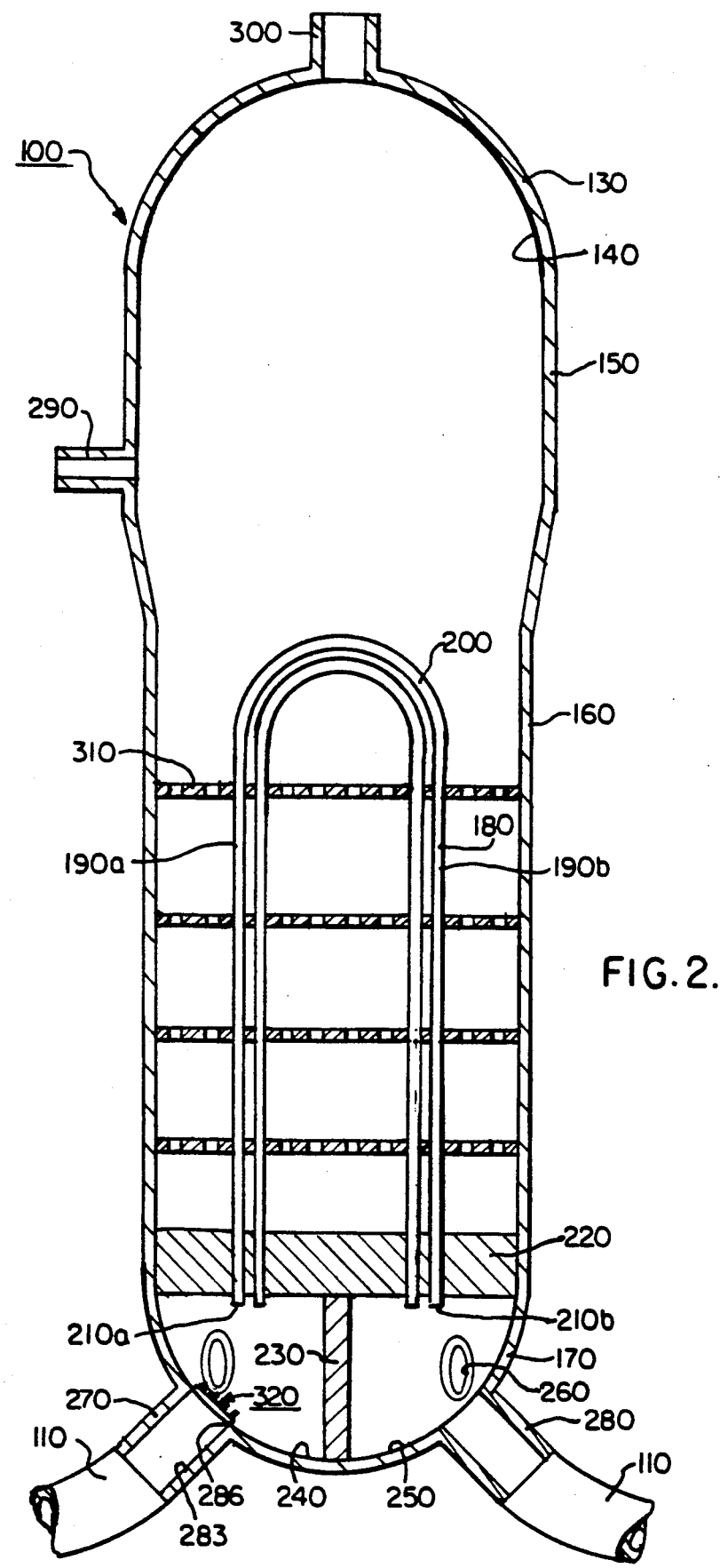
FIG. 2 is a view in partial vertical section of the steam generator with parts removed for clarity, the steam generator having inlet and outlet plena and having an inlet primary nozzle and an outlet primary nozzle in fluid communication with the inlet and outlet plena, respectively.

Referring to FIG. 2, there is shown steam generator 100 with parts removed for clarity. Steam generator 100 comprises a vertically-oriented shell 130 defining a cavity 140 therein. Shell 130 has a generally dome-shaped upper shell portion 150, a generally cylindrical hull portion 160 integrally attached to upper shell portion 150 and a generally bowl-shaped lower shell portion or channel head 170 integrally attached to hull portion 160. Disposed in cavity 140 are a plurality of vertically-oriented inverted U-shaped heat transfer tubes 180 for conducting the radioactive primary fluid therethrough. Each U-shaped tube 180 defines a pair of vertical tube leg portions 190a and 190b interconnected by a U-bend tube portion 200 integrally formed therewith. Each tube leg portion 190a and 190b has a pair of open tube ends 210a and 210b, respectively, for passage of the primary fluid therethrough. Moreover, disposed in cavity 140 near lower shell portion 170 is a horizontal tube sheet 220 having a plurality of apertures for receiving and for vertically supporting each open tube end 210a/210b, which open tube ends 210a/210b are suitably attached to tube sheet 220, such as by welding.

Referring yet again to FIG. 2, disposed in lower shell portion 170 is a vertical divider plate 230 for dividing lower shell portion 170 into an inlet plenum chamber 240 and an outlet plenum chamber 250. Moreover, formed through lower shell portion 170 and in communication with inlet plenum chamber 240 and outlet plenum chamber 250 are a plurality of relatively small diameter access ports or manway openings 260 (only two of which are shown) for providing access to inlet and outlet plena 240/250 so that maintenance can be performed in steam generator 100. Such maintenance may be to inspect any of the tubes 180 for degradation and/or to repair any degraded tubes 180. Of course, manway openings 260 are capable of being sealingly covered by suitable manway covers and seals (not shown) during operation of steam generator 100.

As illustrated in FIG. 2, integrally attached to lower shell portion 170 is a conduit, such as inlet primary nozzle 270, and another conduit, such as outlet primary nozzle 280, in fluid communication with inlet plenum chamber 240 and with outlet plenum chamber 250, respectively. Each of the primary nozzles 270 and 280 has an inside surface 283 defining an open end 286 of diameter larger than the diameter of manway openings 260, the open end 286 defining an annular depending shoulder or rim 288 therearound (see FIG. 4). As shown in FIG. 2, integrally attached to upper shell portion 150 is a feedwater nozzle 290 for passage of non-radioactive secondary fluid or feedwater (i.e., demineralized water) into cavity 140 of steam generator 100. In addition, integrally attached to the top of upper shell portion 150 is a main steam line nozzle 300 for passage of steam therethrough. Moreover, attached to hull portion 260 and horizontally disposed in cavity 140 are a plurality of circular spaced-apart tube support plates 310 (only four of which are shown) having holes therethrough for receiving each tube leg portion 190a/190b so that each tube 180 is laterally supported thereby. Each support plate 310 also has a plurality of unobstructed additional holes therethrough for passage of the non-radioactive secondary fluid.

During operation of steam generator 100, the primary fluid, which is heated by reactor core 40, is pumped from reactor core 40, through one segment of pipe 110, through inlet primary nozzle 270 and into inlet plenum chamber 240. The primary fluid then flows through open tube end 210a, through tube 180, out the other open tube end 210b and into outlet plenum chamber 250, whereupon the primary fluid exits steam generator 100 through outlet primary nozzle 280 and is returned by another segment of pipe 110 to reactor core 40. As the primary fluid flows through tubes 180, secondary fluid simultaneously enters cavity 140 through feedwater nozzle 290 to surround tubes 180. It will be appreciated that as the primary fluid flows through tubes 180, it gives up its heat to the secondary fluid surrounding tubes 180. A portion of the secondary fluid surrounding heat transfer tubes 180 is converted to steam which rises upwardly to exit steam generator 100 through main steam line nozzle 300. The steam is then transported to a turbine-generator (not shown) for producing electricity in a manner well known in the art of steam-powered electricity production. Such a typical nuclear steam generator is more fully disclosed in U.S. Pat. No. 4,079,701 entitled "Steam Generator Sludge Removal System" issued Mar. 21, 1978 to Robert A.l Hickman et al., the disclosure of which is hereby incorporated by reference.

Figure 3:
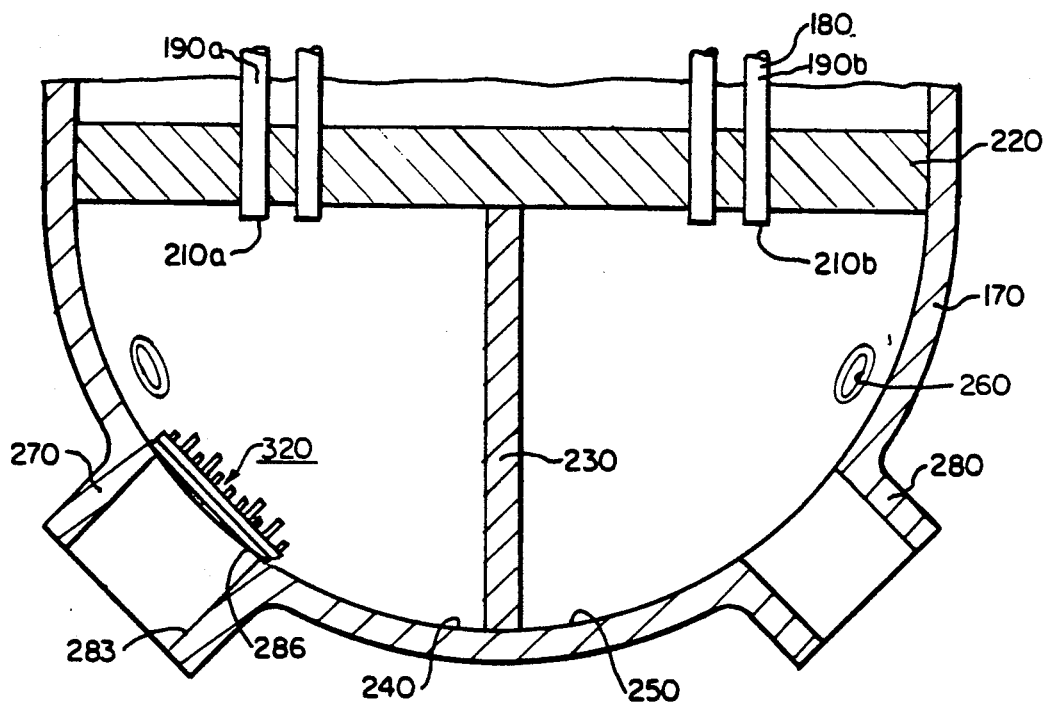
FIG. 3 is a view in vertical section of the inlet and outlet plena of the steam generator showing a foldable nozzle dam of the present invention installed across the open end of the inlet primary nozzle.

Referring briefly to FIG. 3, there is shown the subject matter of the present invention, which is a circular foldable nozzle dam 320 having an extrusion-resistant seal or gasket, nozzle dam 320 being disposed in inlet plenum chamber 240 and across open end 286 of inlet primary nozzle 270 to block or seal inlet primary nozzle 270, as more fully described hereinbelow. It will be appreciated that although nozzle dam 320 is shown disposed in inlet plenum chamber 240 and across the open end of inlet primary nozzle 270, nozzle dam 320 may also be disposed in outlet plenum chamber 250 and across the open end of outlet primary nozzle 280 to block or seal outlet primary nozzle 280. Thus, although the description of the invention refers to sealing or blocking inlet primary nozzle 270, it will be understood that the invention may be used to seal or block outlet primary nozzle 280 as well.

Figure 4:
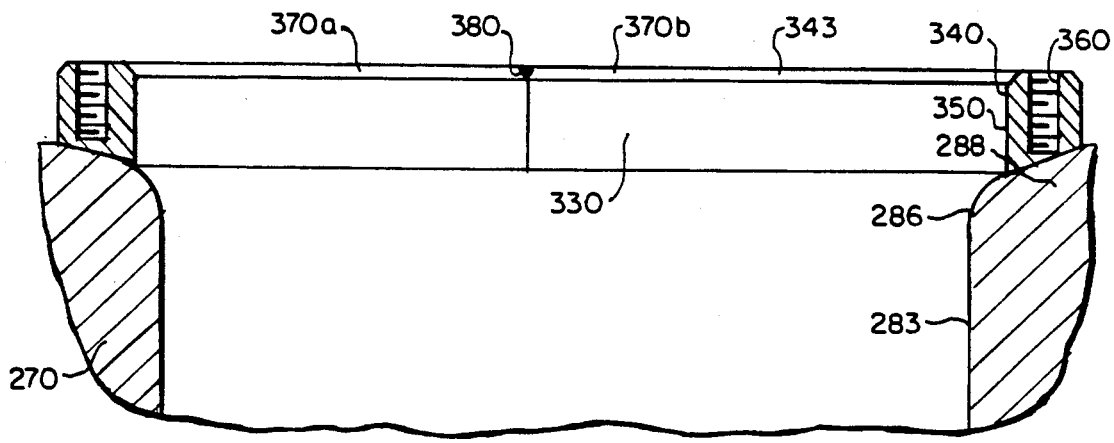
FIG. 4 is a view in vertical section of a bracket attached to the open end of the inlet primary nozzle.
Figure 5:
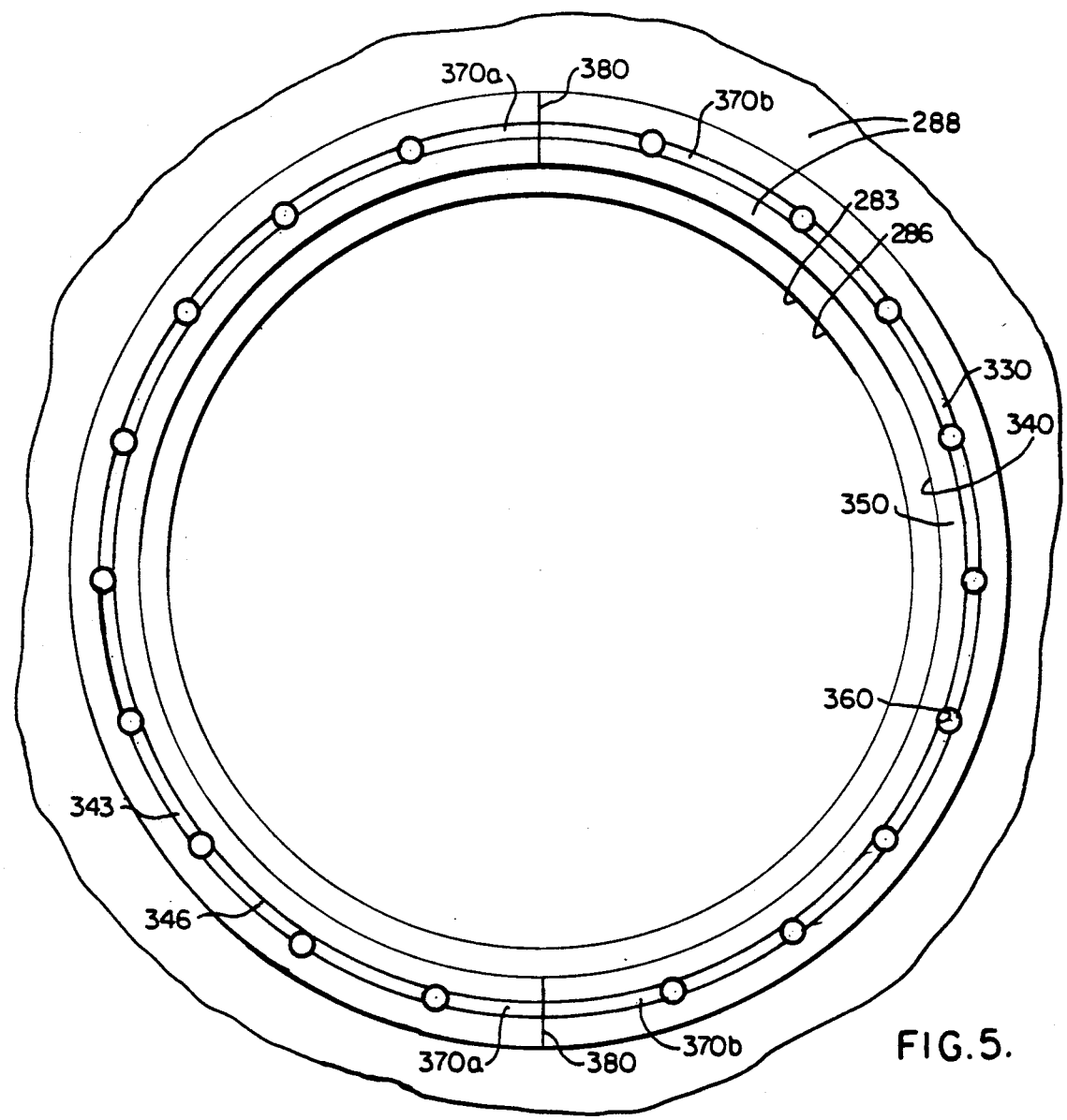
FIG. 5 is a plan view of the bracket.

Turning now to FIGS. 4 and 5, a generally annular ring member or bracket 330 is permanently sealingly attached, such as by welding, to rim 288 of inlet primary nozzle 270, for reasons described more fully hereinbelow. Bracket 330 is permanently attached to rim 288 and remains attached to rim 288 as steam generator 100 is operated (i.e., generates steam) in the manner disclosed hereinabove. For this purpose, annular bracket 330 defines a generally circular opening 340 centrally transversely therethrough for passage of the primary fluid during operation of steam generator 100. Bracket 330 has a top surface 343 thereon having a multiplicity of grooves 346 (only two of which are shown in FIG. 5) formed therein for reasons provided hereinbelow. Grooves 346 provide a roughened top surface 343 for reasons more fully described hereinbelow. Moreover, bracket 330 may be "INCONEL", stainless steel or the like, to resist stress corrosion cracking during operation of steam generator 100. Bracket 330 is preferably fabricated of stress corrosion resistant material because stress corrosion cracking of bracket 330 may lead to creation of fluid flow paths therethrough such that inlet primary nozzle 270 is not sealed when nozzle dam 320 is installed in the manner more fully described hereinbelow. More specifically, the "INCONEL" material may comprise by weight approximately 76.0% nickel, 0.08% carbon, 0.5% manganese, 8.0% iron, 0.008% sulfur, 0.25% copper and 15.5% chromium. Bracket 330 also has an integral periphery portion 350 extending circumferentially therearound. The bottom of periphery portion 350 of bracket 330 is sealingly attached to rim 288, such as by welding. Bracket 330 may also have a slot 355 (see FIG. 8) extending around the bottom thereof for pressure testing the soundness of the weldment that sealingly attaches the bottom of periphery portion 350 to rim 288. In this regard, a source of pressurized gas (not shown) is connected to a channel 357 that is in gas communication with slot 355. The pressurized gas (e.g., nitrogen) is passed through channel 357 and flows into slot 355. If the weldment is not sound, the gas will leak from slot 355 and across the bottom of bracket 330 and will be detected by means known in the art. Alternatively, if the weldment is not sound, the gas will leak from slot 355 and a maximum stable or equilibrium value for the gas pressure will not be obtainable. If the weldment is sound, the gas will not leak from slot 355 and a plug (not shown) will be welded into channel 357 to permanently seal channel 357.

As shown in FIGS. 4 and 5, formed through periphery portion 350 are a plurality of spaced-apart threaded transverse holes 360 disposed circumferentially around periphery portion 350 at predetermined intervals. In addition, bracket 330 may be formed of a plurality of mating sections, such as half section 370a and 370b, sealingly joined, such as by welding, at their interface 380. In one embodiment of the invention, bracket 330 is formed of section 370a and 370b in order to pass each section 370a/370b separately through the relatively small diameter manway 260 and yet dispose the assembled sections 370a/370b that comprise bracket 330 completely circumferentially around open end 286 of inlet primary nozzle 270. Bracket 330 provides a foundation or support means for supporting nozzle dam 320, as described in more detail hereinbelow.

Referring to FIGS. 6, 7, 17 and 18, mounted atop bracket 330 is foldable nozzle dam 320 for sealingly covering opening 340 of bracket 330. As described in more detail hereinbelow, nozzle dam 320 is foldable for passing through the relatively small diameter manway 260 and unfoldable for being disposed completely across opening 340 of bracket 330. In this regard, nozzle dam 320 comprises a generally arcuate-shaped first wing or first side section 390a hingedly connected by a pair of hinge assemblies, generally referred to as 400, to a generally arcuate-shaped second wing or second side section 390b. A handle 395, which is adapted to be grasped by hand or by a suitable tool (not shown), is attached to each side section 390a and 390b for outwardly and inwardly pivoting side sections 390a and 390b about hinge assembly 400. In use, side sections 390a and 390b are capable of being pivoted about hinge assembly 400 such that they are deployable in the same plane with respect to each other in order to cover opening 340. Each side section 390a and 390b defines a generally rectangular cut-out 405 (best seen in FIG. 16) open on one side for maneuvering nozzle dam 320 through manway 260.

As shown in FIGS. 6, 7, 8 and 8A, each side section 390a and 390b defines an integral semi-circular periphery portion 410 having a plurality of spaced-apart smooth bores 420 therethrough. Bores 420 are formed such that they are capable of being coaxially aligned with threaded holes 360 of bracket 330, for reasons provided immediately hereinbelow. Each bore 420 is capable of matingly receiving therethrough clamping means, such as an externally threaded elongated shank portion 430 belonging to a fastener or bolt 440, for removably fastening or bolting nozzle dam 320 to bracket 330. Each bolt 440 has a bolt head 450 integral therewith so that bolt 440 may be turned to threadably engage hole 360 for tightly connecting nozzle dam 320 to bracket 330. Moreover, interposed between periphery portion 410 and bolt head 450 is an adjustable positioning block 460 connected to periphery portion 410 by a shoulder screw 470 and having a threaded bore therethrough for threadably receiving bolt 440 to connect nozzle dam 320 to bracket 330. The adjustable feature of positioning block 460 allows it to align bolt 440 with bore 420 and hole 360. Each positioning block 460 is adjustable in the sense that it can be rotated in a 360° circle about shoulder screw 470, as shown by the dotted circular arrow in FIG. 8A, and moved laterally with respect to shoulder screw 470, as shown by the straight solid arrow in FIG. 8A.

Figure 8:
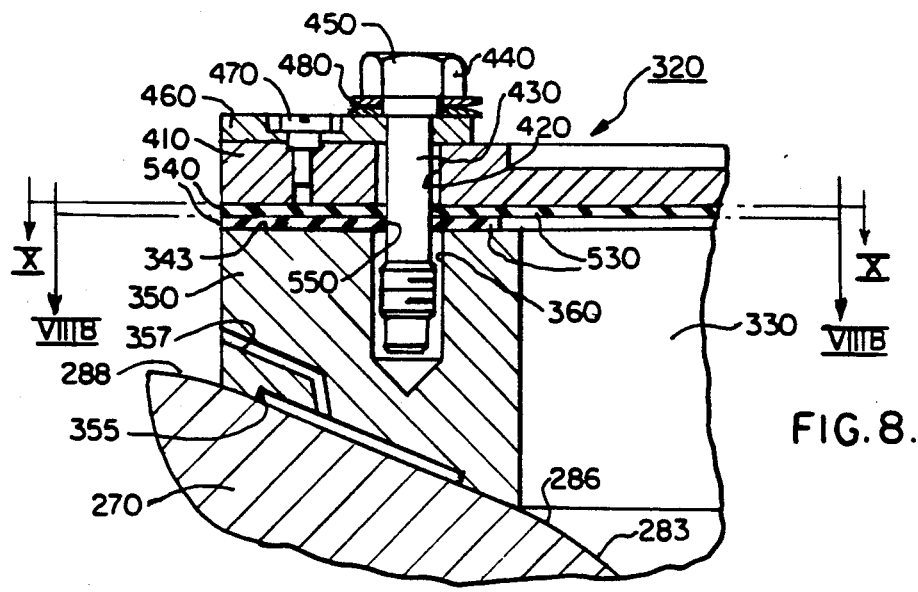
FIG. 8 is a fragmentation view in partial vertical section of the nozzle dam showing a clamping bolt passing through the nozzle dam, through a foldable seal or gasket attached to the nozzle dam and into the bracket.
Figure 8C:
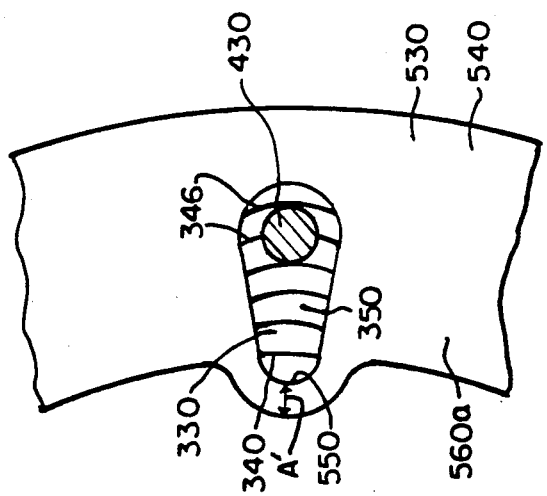
FIG. 8C is an enlarged fragmentation plan view of the seal in an extruded state resulting in an excessively enlarged aperture.
Figure 8B:
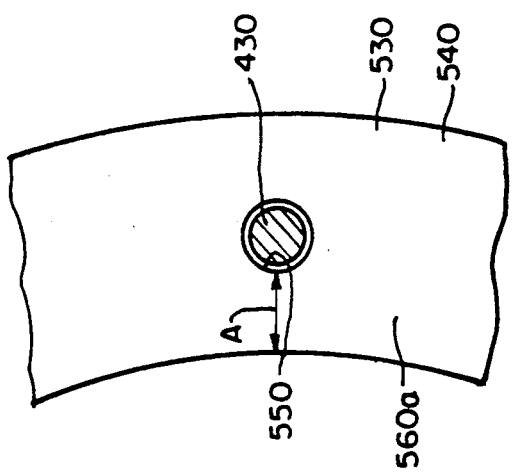
FIG. 8B is an enlarged fragmentation plan view taken along section line VIIIB—VIIIB of FIG. 8 showing the seal having an aperture therethrough for receiving the clamping bolt.
Figure 8A:
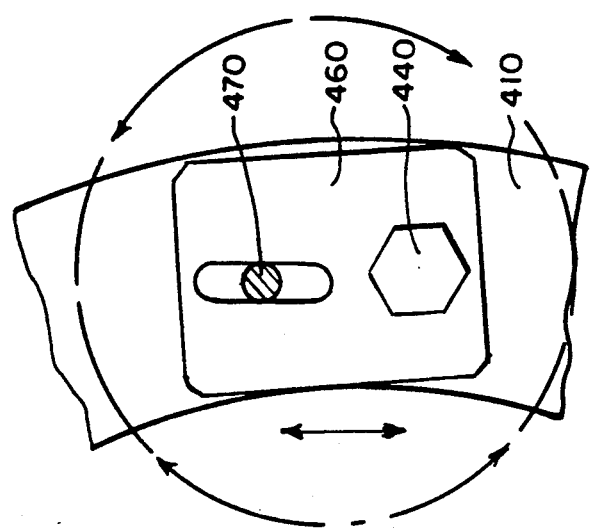
FIG. 8A is an enlarged fragmentation plan view of an adjustable positioning block belonging to the invention.
Figure 10:
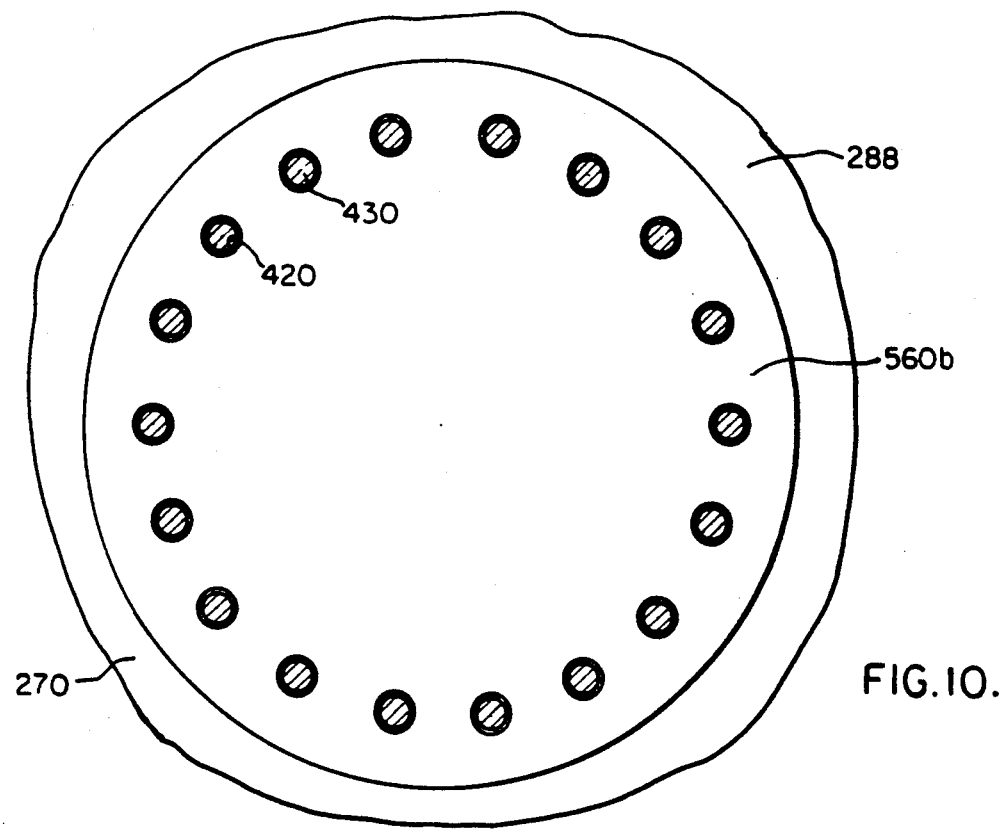
FIG. 10 is a plan view along section line X—X of FIG. 8 showing a circular second layer, which in use is glued or bonded to the nozzle dam and to the first layer of the laminated seal or gasket.
Figure 9:
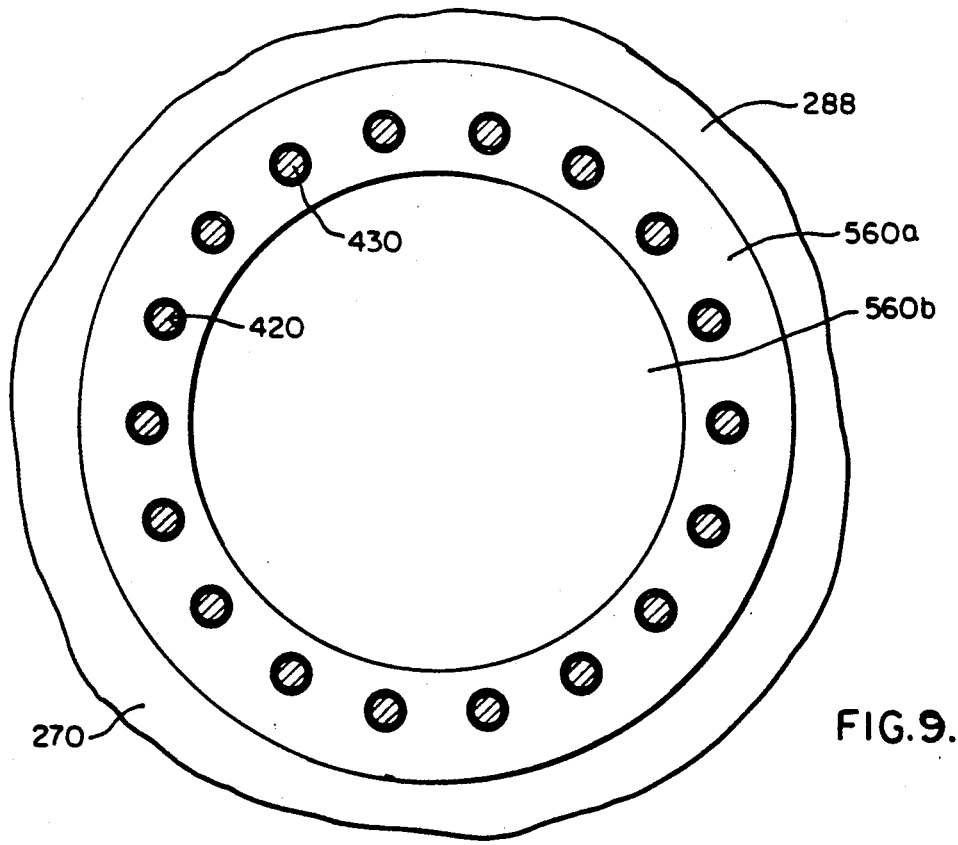
FIG. 9 is a plan view of an annular first layer of a laminated seal or gasket.

In addition, as best seen in FIG. 8, disposed between positioning block 460 and bolt head 450 may be a set of leaf springs 480 for longitudinally tensioning bolt 440 so that bolt 440 snugly intimately engages the threads of hole 360.

Referring again to FIGS. 6 and 7, a generally rectangular center section 490 is matingly disposed in opening 405 defined by side section 390a and 390b for completely covering opening 405, center section 490 having integral arcuate-shaped end portions 500 capable of being bolted to bracket 330 by a plurality of spaced-apart bolts 505. Each arcuate-shaped end portion 500 has the same radius as the radius of side sections 390a and 390b. When center section 490 is bolted to bracket 330 and to side sections 390a and 390b, nozzle dam 320 assumes a rigid generally circular and planar configuration for completely covering opening 350 of bracket 330. Thus, nozzle dam 320 functions as a cover plate for covering opening 350 of bracket 330. The configuration of nozzle dam 320, when fully assembled, is sufficiently structurally sound to block, the column of water present in nozzle 270 or 280 during reactor refueling operations. Moreover, in the preferred embodiment of the invention, a handle 510 having a hole 520 therethrough extends along each longitudinal side of center section 490 to provide means for removably disposing center section 490 in opening 405.

As best seen in FIGS. 7, 8, 8B and 8C, interposed between top surface 343 of bracket 330 and nozzle dam 320 is extrusion-resistant seal means, such as a foldable extrusion-resistant seal member or gasket 530, for providing a fluid-tight seal between nozzle dam 320 and bracket 330 so that fluid will not pass through opening 340 of bracket 330. Of course, it will be appreciated that sealing opening 340 in this manner also seals inlet primary nozzle 270. As disclosed in more detail hereinbelow, seal member 530 has an integral periphery portion 540 therearound having a plurality of spaced-apart transverse apertures 550 therethrough for receiving shank portion 430 of each bolt 440 and 505. As disclosed hereinabove, sections 390a, 390b and 490 comprising nozzle dam 320 are drawn toward top surface 343 of bracket 330 as bolts 440 and 505 pass through bore 420 and threadably engage hole 360. Bolts 440 and 505 may be torqued to a value of approximately 175±25 foot-pounds force so that bolts 440/505 are neither undertorqued nor overtorqued. As sections 390a, 390b and 490 are drawn toward bracket 330, a compressive force will act perpendicularly on each opposing face or side of seal member 530 because seal member 530 is interposed between sections 390a, 390b, 490 and bracket 330. This compressive force acting perpendicularly against each side of seal member 530 will tend to cause aperture 550 of seal member 530 to extrude laterally outwardly away from shank portion 430 of bolt 440 and bolt 505 and assume a generally oval shape. Such extrusion of aperture 550 laterally away from shank portion 430 as sections 390a, 390b and 490 are tightly connected to bracket 330 will tend to enlarge the annular gap or fluid flow path defined by aperture 550 that surrounds shank portion 430 (see FIG. 8C). Such enlargement of the gap defined by aperture 420 will tend to decrease the surface area "A" to a smaller area "A'", which area "A" is available for sealing, between bracket opening 340 and aperture 550 (see FIGS. 8B and 8C). Excessive extrusion may result in a portion of aperture 550 overlapping opening 340 such that any fluid present in opening 340 will easily flow through that portion of aperture 550 overlapping opening 340. This is undesirable because such enlargement of the gap or flow path will compromise the ability of seal member 530 to perform its intended function of providing a nozzle dam 320 that is fluid-tight. Thus, according to the invention, seal member 530 is configured to be extrusion-resistant so that seal member 530 will not excessively laterally extrude away from bolts 440 and 505 in a manner that excessively enlarges the fluid flow path defined by apertures 550 surrounding bolts 440 and 505, as described in more detail hereinbelow. It should be understood that aperture 550 may experience some limited extrusion laterally away from shank portion 430 as sections 390a, 390b and 490 are tightly connected to bracket 330. However, such limited extrusion will not be sufficient to cause any portion of aperture 550 to overlap opening 340.

Turning now to FIGS. 9, 10, 11, and 12, seal member 530 comprises a plurality of layers laminated or bonded together. In the preferred embodiment of the invention, seal member 530 comprises a generally annular first layer 560a. First layer 560a is sealingly bonded, such as by a suitable adhesive, to the underside of a generally circular second layer 560b. Second layer 560b is sealingly attached, such as by a suitable adhesive, to periphery portion 410 of first side section 390a and to periphery portion 410 of second side section 390b of nozzle dam 320. In addition, second layer 560b is circular and extends across the diameter of nozzle dam 320 for covering opening 405 so that fluid cannot pass through opening 405. First layer 560a, which may be EPDM (ethylene propylene diene monomer) rubber, has a Shore A durometer hardness of between approximately 40 and 60, and preferably a durometer hardness of approximately 50. Second layer 560b, which also may be EPDM rubber, has a Shore A durometer hardness of between approximately 60 and 80, and preferably a durometer hardness of approximately 70. The dual hardness of seal member 530 allows it to be extrusion-resistant and also allows it to intimately engage top surface 343 of bracket 330 for creating a seal between nozzle dam 320 and bracket 330. It will be appreciated that the relatively harder material of second layer 560b resists extrusion and the relatively softer material of first layer 560a assists in maintaining seal member 530 in intimate sealing engagement with top surface 343.

Figure 12:
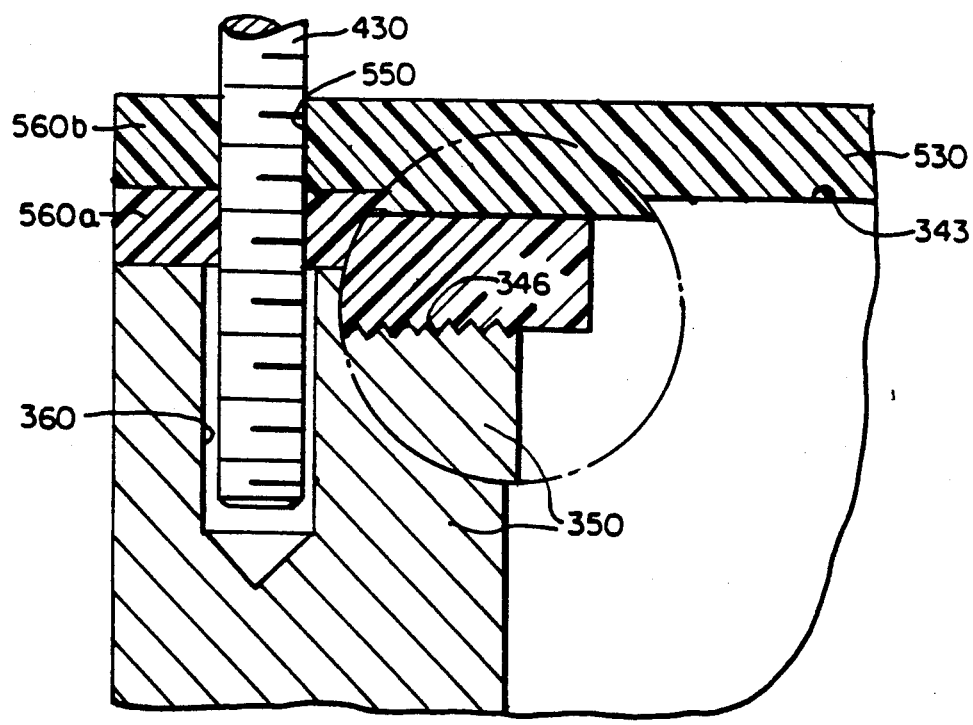
FIG. 12 is an enlarged fragmentation view in vertical section of the laminated seal or gasket showing the second layer glued or bonded to the first layer, this view also showing the clamping bolts passing through the apertures of the first and second layers of the laminated seal or gasket.

As best seen in FIG. 12, first layer 560a is relatively soft for intimately engaging the grooves 346 formed in top surface 343 of bracket 330. The intimate engagement of first layer 560a with grooves 346 provides a multiplicity of obstructions or ridges that oppose the migration or leakage of the primary fluid along the interface of first layer 560a and top surface 343 of bracket 330. Such ridges will tend to increase the pressure drop of any fluid that would tend to migrate or leak across the interface, thereby reducing the rate of or eliminating such leakage. That is, if the primary fluid should tend to migrate along this interface, the pressure of the fluid at the interface will tend to drop as it traverses grooves 346. Such a pressure drop will tend to further limit or eliminate the migration or leakage at the interface because the pressure driving the fluid along the interface will decrease as the fluid migrates or leaks along the interface. Moreover, the intimate frictional engagement of first layer 560a and grooves 346 assists in resisting extrusion and in maintaining seal member 530 in sealing intimate engagement with top surface 343 of bracket 330 so that the fluid path defined by aperture 550 surrounding shank portion 430 is not enlarged as nozzle dam 320 is bolted to bracket 330.

Figure 13:
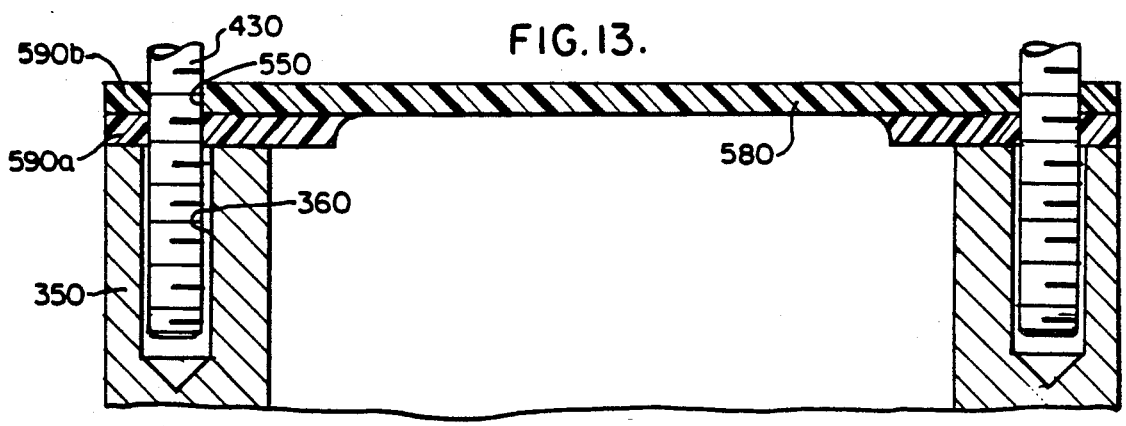
FIG. 13 is a view in vertical section of an alternative embodiment of the seal or gasket, the seal or gasket having molded regions rather than laminated layers.
Figure 6:
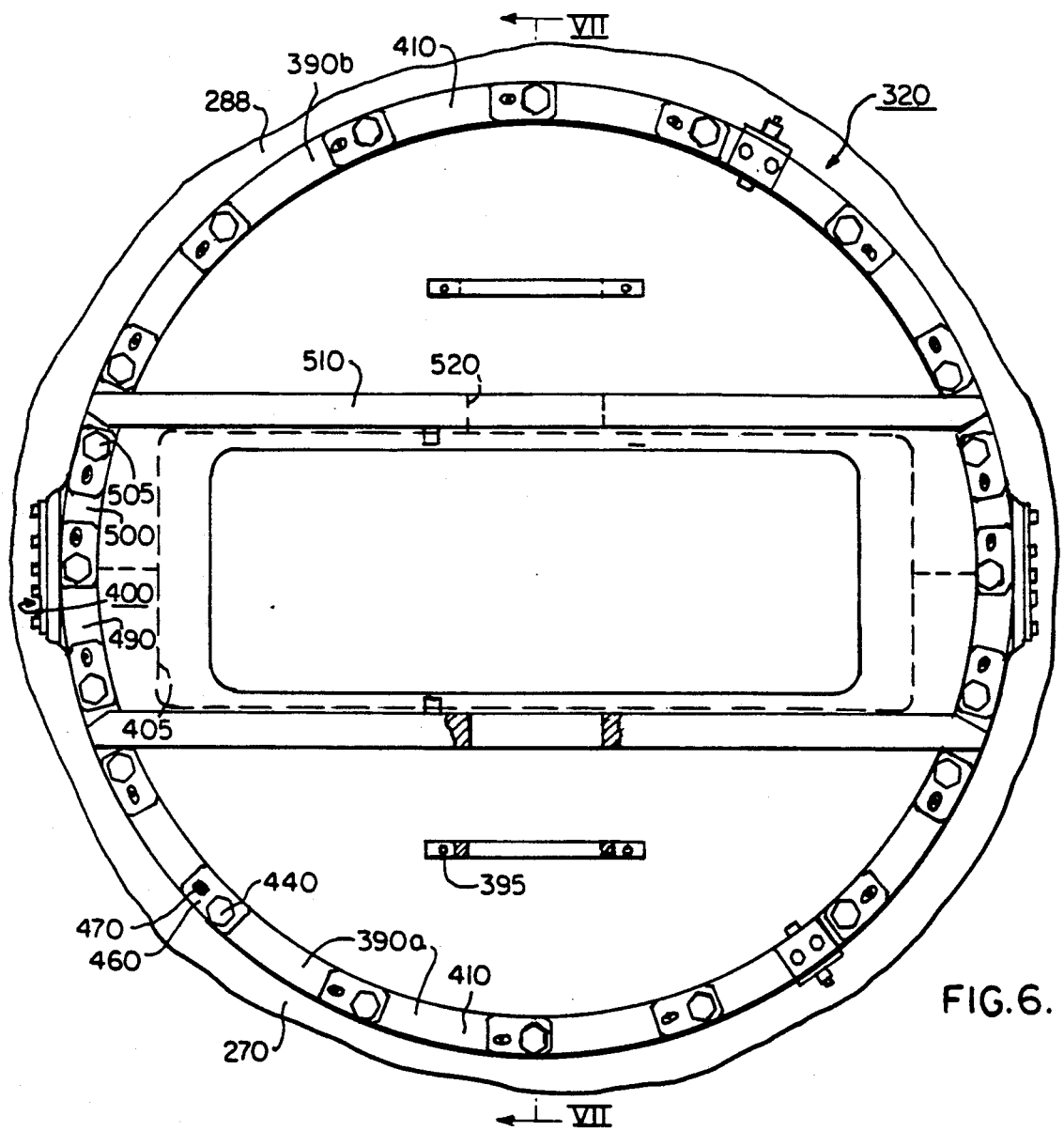
FIG. 6 is a plan view of the nozzle dam.
Figure 14:
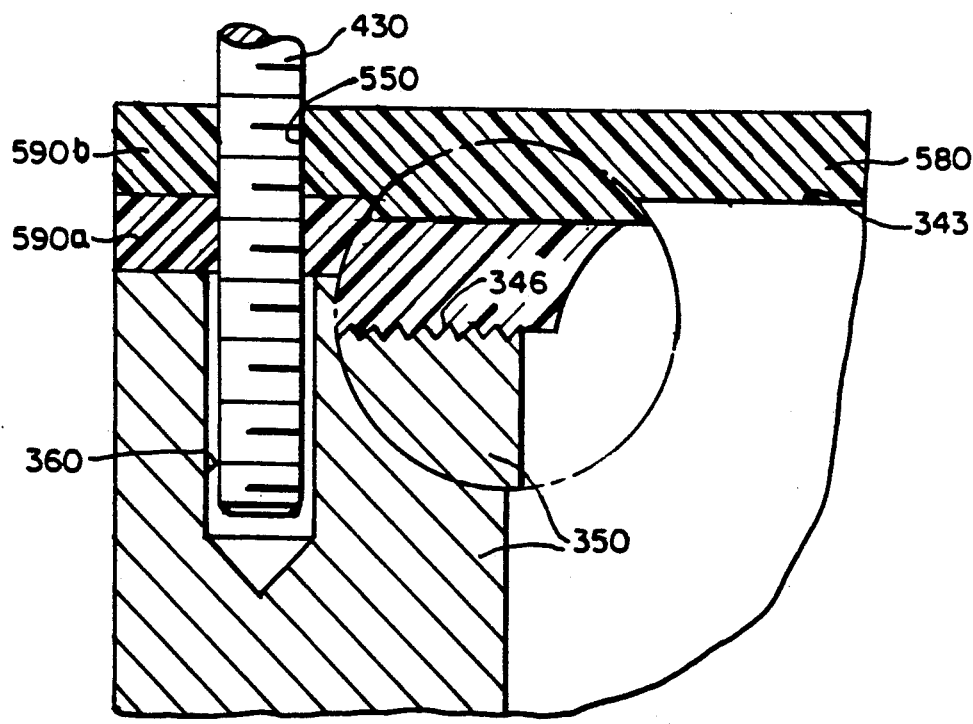
FIG. 14 is an enlarged fragmentation view in vertical section of the alternative embodiment of the molded seal or gasket.

Referring now to FIGS. 13 and 14, there is shown an alternative embodiment of seal member 530, referred to as seal member 580, comprising a plurality of molded regions 590a/590b rather than laminated layers 560a and 560b. In this alternative embodiment of the invention, seal member 580 comprises a generally annular first region 590a. First region 590a is sealingly molded, such as by a press-cure process, to the underside of a generally circular second region 590b. Second region 590b is sealingly attached, such as by a suitable adhesive, to periphery portion 410 of first side section 390a and to periphery portion 410 of second side section 390b of nozzle dam 320. In addition, second region 590b extends across the diameter of nozzle dam 320 for covering opening 405 defined by side sections 390a, 390b so that fluid cannot pass through opening 405. First region 590a, which may be EPDM rubber, has a Shore A durometer hardness of between approximately 40 and 60, and preferably a durometer hardness of approximately 50. Second region 590b, which may be EPDM rubber, has a Shore A durometer hardness of between approximately 60 and 80, and preferably a durometer hardness of approximately 70.

Figure 15:
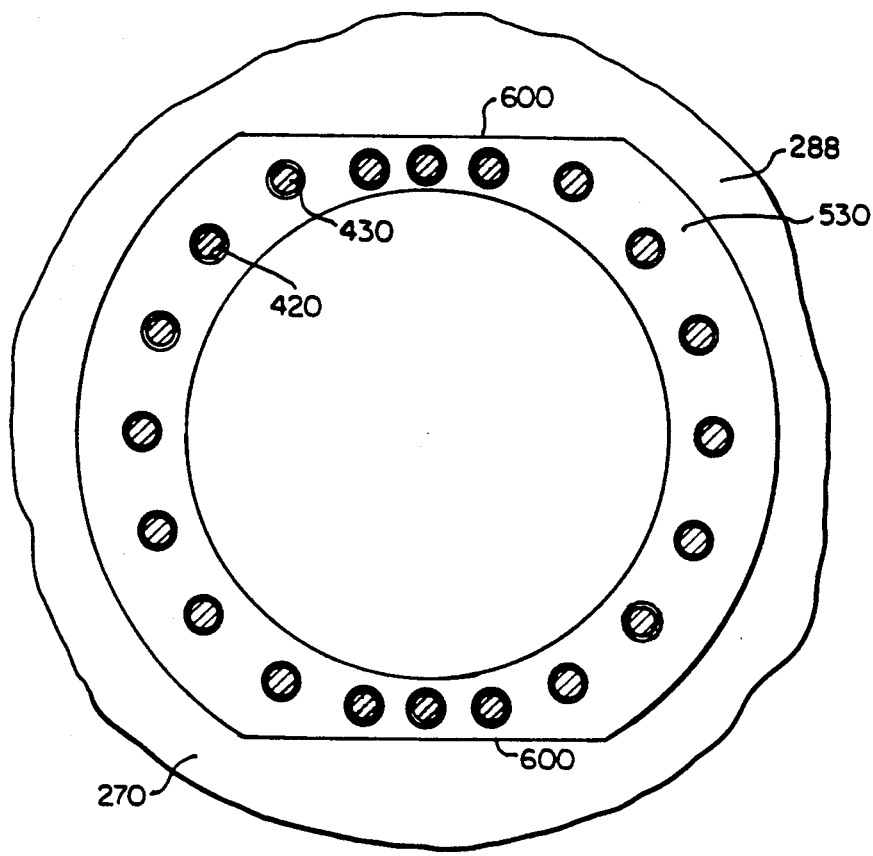
FIG. 15 illustrates in plan view another alternative embodiment of the seal or gasket.

Referring briefly to FIG. 15, yet another embodiment of seal member 530 is shown. In this alternative embodiment, seal member 530, including layers 560a and 560b associated therewith, has truncated sides 600 to easily accommodate hinge assembly 400 (see FIGS. 17 and 18).

Figure 16:
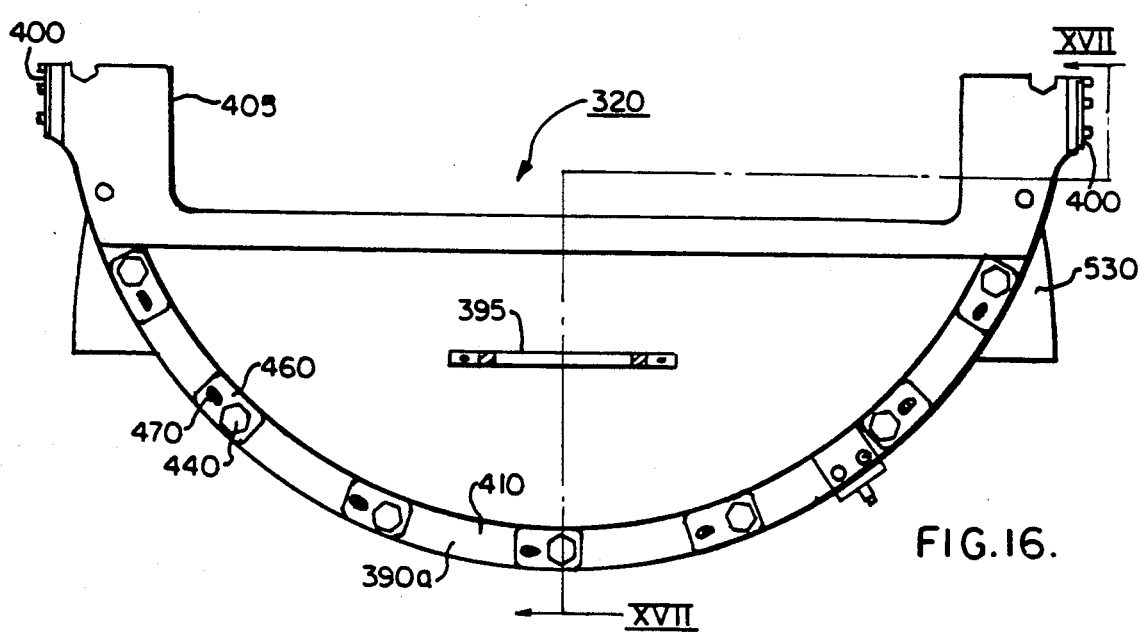
FIG. 16 is a lateral view of the nozzle dam in its folded state.
Figure 17:
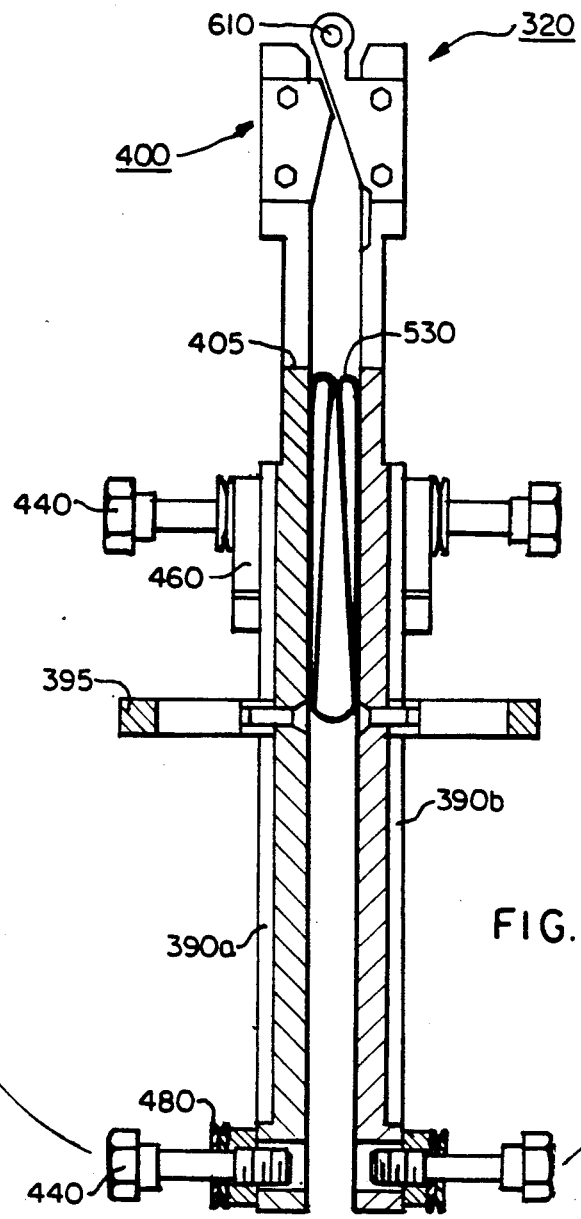
FIG. 17 is an end view in partial vertical section taken along section line XVII—XVII of FIG. 16 showing the nozzle dam in its folded state and also showing a folded extrusion-resistant seal or gasket attached to the nozzle dam.
Figure 18:
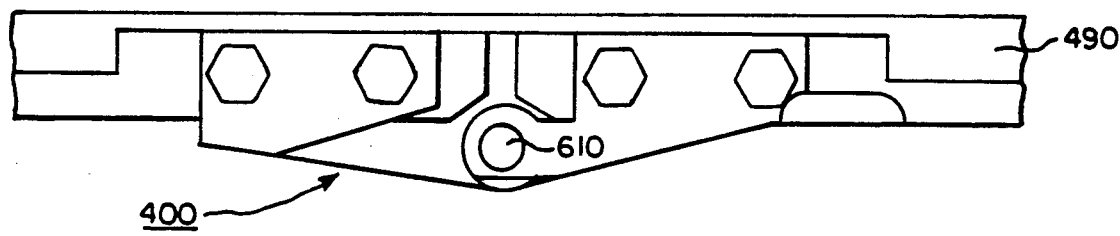
FIG. 18 is a view of a hinge assembly associated with the foldable nozzle dam.

Referring to FIGS. 16, 17, and 18, side sections 390a and 390b, which are pivotably hingedly connected together, are there shown in a folded state to pass through the relatively small diameter of manway opening 260 of steam generator 100. As disclosed hereinabove, the diameter of open end 286 of inlet primary nozzle 270 may be larger than the diameter of manway opening 260. Thus, nozzle dam 320 is foldable to pass through manway opening 260 and unfoldable to be disposed completely across opening 340 of bracket 330, such that it also covers open end 286 of inlet primary nozzle 270. Moreover, seal member 530 or 580 is also foldable because seal member 530 or 580 is sealingly permanently attached to foldable nozzle dam 320 in the manner previously described. As best seen in FIGS. 17 and 18, hinge assembly 400 includes a pivot pin 610 for allowing first side section 390a and second side section 390b of nozzle dam 320 to pivot thereabout. As disclosed hereinabove, first side section 390a, second side section 390b and center section 490 are capable of being securely locked in the same transverse plane with respect to each other to cover opening 286 of bracket 330 (as best seen in FIG. 7) when center section 490 is bolted to side sections 390a and 390b by bolts 505.

By way of example only and not by way of limitation, steam generator manway opening 260 may have a diameter of approximately 16 inches and open end 286 of inlet primary nozzle 270 (or outlet primary nozzle 280) may have a diameter of approximately 38 inches. Thus, the diameter of manway opening 260 is substantially smaller than the diameter of open end 286 of inlet primary nozzle 270. Moreover, the outside diameter of bracket 330 may be approximately 41.5 inches and the inside diameter of bracket 330 may be approximately 38.5 inches. Thus, in the preferred embodiment, bracket 330 has an inside diameter slightly greater than the diameter of open end 286 for surrounding open end 286. When mounted atop bracket 330, the diameter of nozzle dam 320 may be roughly 42 inches in its unfolded state. However, in its folded state, each side section 390a/390b generally defines a half-circle having a radius of roughly 21 inches and has cut-out 405 for allowing nozzle dam 320 to be maneuvered through manway opening 260. The annular first layer 560a of laminated seal member 530, which intimately engages top surface 343 of bracket 330 and which is adhesively attached to second layer 560b, has an inside diameter of approximately 34 inches and an outside diameter of roughly 42 inches in the preferred embodiment. The second layer 560b of laminated seal member 530, which is adhesively attached to sections 390a and 390b, has a diameter of roughly 42 inches in the preferred embodiment. Moreover, the first layer 560a may have a transverse thickness of approximately 0.188 inches and the second layer 560b may have a transverse thickness of approximately 0.125 inches resulting in a laminated seal member 530 having a total transverse thickness of approximately 0.313 inches. In the alternative embodiment of the invention, the first region 590a of molded seal member 580, which intimately engages top surface 343 of bracket 330, has an inside diameter of approximately 34 inches and an outside diameter of approximately 42 inches. The second region 590b of molded seal member 580 has a diameter of roughly 42 inches in the preferred embodiment. The transverse thickness of molded seal member may be approximately 0.313 inches. Moreover, the threaded holes 360 in bracket 330 may have a diameter of approximately 0.750 inch and the smooth bores in nozzle dam 320 may have a diameter of approximately 0.937 inch. The threaded bore in each positioning block 460 has a diameter of approximately 0.750 inch. The apertures in seal member 530 (or seal member 580) may have a diameter of approximately 0.937 inch.

OPERATION

In use, bracket 330 cooperates with nozzle dam 320 and seal member 530 or 580 to sealingly block or cover open end 286 of primary nozzles 270 or 280 so that maintenance can be simultaneously performed in steam generator 100 as reactor core 40 is refueled. In this regard, reactor core 40 is first shut down and the level of water in refueling pool 90 is drained, in a manner well understood in the art, to a level that is below the elevation of inlet and outlet primary nozzles 270/280. It will be appreciated that draining refueling pool 90 to a level that is below the elevation of inlet and outlet nozzles 270/280 also drains heat transfer tubes 180 and plenum chambers 240/250. Next, the manway covers (not shown) are removed from the relatively small diameter manway openings 260 for providing access to the steam generator plena (e.g., inlet plenum chamber 240). At this point, first side section 390a and second side section 390b are folded inwardly toward each other about pivot pin 610, which belongs to hinge assembly 400, so that sections 390a/390b can be maneuvered through the relatively small diameter manway opening 260. Once inside inlet plenum chamber 240, sections 390a/390b are unfolded outwardly to an outstretched configuration, using handles 395, for mounting sections 390a/390b on bracket 330 to cover opening 340 of bracket 330. Of course, it will be understood that bracket 330 will have been previously sealingly attached to open end 286 of nozzle 270. In this regard, each section 370a/370b of bracket 330 will have been separately passed through manway opening 260 and matingly attached together, such as by welding, at the interface 380 thereof. Alternatively, bracket 330 may be a unitary one-piece member sealingly attached to open end 286 of nozzle 270 during manufacture of steam generator 100.

Sections 390a/390b are mounted atop bracket 330, using handles 395, such that smooth bores 420 of sections 390a/390b are roughly aligned with threaded holes 360 of bracket 330. Adjustable positioning block 460 is caused to pivot about shoulder screw 470 and/or moved laterally with respect to shoulder screw 470 until bolt 440 is coaxially aligned with hole 360. Once bores 420 are coaxially aligned with holes 360, bolts 440 are caused to pass through bores 420 and threadably engage holes 360 for removably clamping or connecting sections 390a/390b to bracket 330. Next, center section 490 is passed through manway opening 260 and matingly disposed, using handles 510, to cover cut-outs 405 defined by side sections 390a/390b. At this point, center section 490 is attached to side sections 390a/390b by bolts 505 that threadably engage holes 360. Once sections 390a, 390b and 490 are properly aligned, all bolts are uniformly torqued in a controlled manner to predetermined torque values. In this manner, side sections 390a/390b and center section 490 form the rigid circular nozzle dam 320 used for covering opening 340 of bracket 330.

As described hereinabove, interposed between nozzle dam 320 and bracket 330 is extrusion-resistant seal member 530 or 580, which is adhesively attached to side section 390a/390b, for providing a fluid-tight seal between nozzle dam 320 and bracket 330. As sections 390a, 390b and 490 comprising nozzle dam 320 are drawn toward top surface 343 of bracket 330 when bolts 440 and 505 threadably engage holes 360, a compressive force will act perpendicularly on each opposing face or side of seal member 530 because seal member 530 is interposed between sections 390a, 390b, 490 and bracket 330. This compressive force acting perpendicularly against each side of seal member 530 will tend to cause aperture 550 of seal member 530 to extrude laterally outwardly away from shank portion 430 of each bolt 440 and bolt 505. Such extrusion of aperture 550 laterally away from shank portion 430 as sections 390a, 390b and 490 are tightly clamped to bracket 330 will tend to enlarge the annular gap or fluid flow path surrounding shank portion 430. Such enlargement of the gap will tend to decrease the surface area "A", which is available for sealing, between bracket opening 340 and aperture 420. Excessive extrusion may result in a portion of aperture 420 overlapping opening 340 such that any primary fluid present in opening 340 will easily flow through that portion of aperture 420 overlapping opening 340. This is undesirable because enlargement of such a flow path will compromise the ability of seal member 530 to perform its intended function of providing a nozzle dam 320 that is fluid-tight. Thus, according to the invention, the extrusion-resistant configuration of seal member 530 results in a seal member 530 that will resist lateral extrusion away from bolts 440 and 505 that would otherwise enlarge the fluid flow path surrounding bolts 440 and 505. More specifically, first layer 560a is relatively soft for intimately engaging the grooves 346 formed in top surface 343 of bracket 330. The engagement of first layer 560a with grooves 346 of bracket 330 assists in creating a fluid-tight seal in the manner previously described. Therefore, it will be appreciated that the relatively softer material of first layer 560a (or first region 590a) assists in maintaining seal member 530 in intimate sealing engagement with bracket surface 343 as the relatively harder material of second layer 560b (or second region 590b) resists extrusion of seal member 530 laterally away from bolt 440 (or bolt 505). In addition, as disclosed hereinabove, the intimate engagement of first layer 560a with grooves 346 provides a multiplicity of obstructions or ridges that oppose migration or leakage of the primary fluid along the interface of first layer 560a and top surface 343 of bracket 330. In this regard, such ridges will tend to increase the pressure drop of any fluid that would migrate across the interface, thereby reducing the rate of such leakage. Moreover, it will be appreciated that the relative softness of first layer 560a or first region 590a will allow it to fill any indentations or imperfections in top surface 343 of bracket 330 to further enhance the sealing of nozzle dam 320. In addition, it should also be understood that apertures 550 are punched through seal member 530 or 580 after seal member 530 or 580 is mounted on the nozzle dam assembly such that apertures 550 will precisely align with their associated bolts.

After nozzle dam 320 is suitably installed in inlet primary nozzle 270 in the manner disclosed hereinabove, upper cavity portion 70 of reactor cavity 50 is refilled with water and closure head 30 is removed, in a manner well known in the art, to provide access to reactor core 40 for refueling reactor core 40. However, as upper cavity portion 70 is refilled, the primary fluid will not rise into inlet plenum chamber 240 or outlet plenum chamber 250 because nozzle dam 320 seals or blocks openings 286 of primary nozzles 270/280. At this point, maintenance may be simultaneously performed in steam generator plena 240/250 as reactor core 40 is refueled. After reactor core 40 is refueled and after maintenance is performed in steam generator 100, nozzle dam 320 is removed from steam generator 100 substantially in the reverse order of its installation in steam generator 100.

Although the invention is fully illustrated and described herein, it is not intended that the invention as illustrated and described be limited to the details shown, because various modifications may be obtained with respect to the invention without departing from the spirit of the invention or the scope of equivalents thereof. For example, bracket 330 may be deleted and nozzle dams 320 removably clamped or connected directly to rim 288 of nozzles 270/280. In such a modification of the invention, rim 288 will have a prepared mating surface and threaded holes therein to receive bolts 440. A further modification to the present invention would be to eliminate the grooves 346 in bracket 330, if desired. An additional modification to the present invention would be to provide a seal member 530 made of extrusion-resistant other than homogeneous EPDM. Yet another modification to the present invention would be to provide a seal member comprising relatively soft EPDM rubber but having a multiplicity of extrusion-resistant "NYLON" or like fibers homogeneously dispersed or specifically located therein.

Moreover, although the invention was conceived during an investigation directed towards a foldable nozzle dam having a foldable extrusion-resistant seal or gasket for sealing the open ends of steam generator primary nozzles, the invention may have other uses, such as to seal the open ends of any similar conduit.

Therefore, what is provided is a foldable nozzle dam having a foldable extrusion-resistant seal or gasket for sealing conduits, such as the primary nozzles of a nuclear steam generator.

What is claimed is:

1. An apparatus for sealing a conduit having an open end, the conduit disposed in a steam generator comprising:
   (a) an annular bracket surrounding the open end of the conduit, said bracket defining an opening transversely therethrough and having a periphery portion sealingly attached to the open end of the conduit, the periphery portion having a plurality of spaced-apart holes transversely therein;
   (b) a cover plate mounted on said bracket for covering the opening of said bracket, said cover plate having a periphery portion having a plurality of spaced-apart bores transversely therethrough;
   (c) a plurality of elongated fasteners engaging the holes of said bracket and the bores of said cover plate for tightly connecting said cover plate to said bracket; and
   (d) an extrusion-resistant seal member interposed between said bracket and said cover plate for providing a fluid-tight seal therebetween, said seal member having a periphery portion having a plurality of spaced-apart transverse apertures for receiving said fasteners therethrough, said seal member forming parallel strata of differing hardness at the periphery of said seal member, so that said seal member is extrusion-resistant for resisting extrusion away from said fasteners as said cover plate is tightly connected to said bracket so that the conduit is sealed thereby.

2. The apparatus according to claim 1, wherein said seal member is elastomeric for sealingly engaging said bracket and said cover plate.

3. The apparatus according to claim 2, wherein said strata of said seal member are laminated layers.

4. The apparatus according to claim 3, wherein the laminated layers define a soft first layer for intimately engaging said bracket and a second layer of greater hardness than the first layer for resisting extrusion, the second layer being bonded to the first layer.

5. The apparatus according to claim 4, wherein
   (a) the first layer has a hardness between approximately 40 and 60 durometer; and
   (b) the second layer has a hardness between approximately 60 and 80 durometer.

6. The apparatus according to claim 4, wherein
   (a) the first layer has a hardness of approximately 50 durometer; and
   (b) the second layer has a hardness of approximately 70 durometer.

7. The apparatus according to claim 2, wherein said strata of said seal member are integrally molded regions.

8. The apparatus according to claim 7, wherein the molded regions define a soft first region for intimately engaging said bracket to seal surface imperfections and leak paths and a second region of greater hardness than the first region for resisting extrusion, the second region being integrally molded with the first region.

9. The apparatus according to claim 8, wherein
   (a) the first region has a hardness between approximately 40 and 60 durometer; and
   (b) the second region has a hardness between approximately 60 and 80 durometer.

10. The apparatus according to claim 8, wherein
    (a) the first region has a hardness of approximately 50 durometer; and
    (b) the second region has a hardness of approximately 70 durometer.

11. The apparatus according to claim 3, wherein said seal member is an EPDM.

12. The apparatus according to claim 11, wherein said seal member has "NYLON" fibers homogeneously dispersed therein.

13. The apparatus according to claim 3, wherein said seal member is "NYLON".

14. In a heat exchanger defining a plenum chamber therein and having a nozzle of predetermined inside diameter integrally attached thereto for passage of fluid into or out of the plenum chamber, the nozzle having an open end in fluid communication with the chamber and having a rim surrounding the open end of the nozzle, the heat exchanger having an access port therethrough of predetermined diameter in communication with the plenum chamber for providing access to the plenum chamber, the access port having a diameter smaller than the diameter of the open end of the nozzle, an apparatus for sealing the open end of the nozzle, comprising;
   (a) an annular bracket surrounding the open end of the nozzle, said bracket having a top surface and having a centrally disposed generally circular transverse opening for passage of the fluid therethrough and having a periphery portion therearound sealingly attached to the rim of the nozzle, the periphery portion having a plurality of spaced-apart threaded transverse holes disposed circumferentially therearound;

(b) a generally circular foldable nozzle dam mounted on said bracket for covering the opening of said bracket, said nozzle dam having a periphery portion therearound having a plurality of spaced-apart bores transversely therethrough coaxially aligned with the holes in said bracket;

(c) a plurality of elongated bolts having a threaded shank portion threadably engaging the threaded holes in said bracket, said bolts passing through the bores of said nozzles dam for tightly connecting said nozzle dam to said bracket; and (d) an extrusion-resistant seal member interposed between said bracket and said nozzle dam for providing a fluid-tight seal therebetween, said seal member having a periphery portion having a plurality of spaced-apart transverse apertures for receiving said bolts therethrough, said seal member forming parallel strata of differing hardness at the periphery of said seal member, so that said seal member is extrusion-resistant for resisting extrusion away from the shank portion of said bolts as said nozzle dam is tightly connected to said bracket.

15. The apparatus according to claim 14, wherein said seal member is elastomeric for sealingly engaging said bracket and said nozzle dam.

16. The apparatus according to claim 15, wherein said strata of said seal member are laminated layers, said layers being disposed parallel to the top surface of said bracket.

17. The apparatus according to claim 16,
(a) wherein the laminated layers define a generally annular first layer having a hardness between approximately 40 and 60 durometer; and
(b) wherein the laminated layers define a generally circular second layer having a hardness between approximately 60 and 80 durometer, the second layer adhesively bonded to the first layer.

18. The apparatus according to claim 16,
(a) wherein the laminated layers define a first layer having a hardness of approximately 50 durometer; and
(b) wherein the laminated layers define a second layer having a hardness of approximately 70 durometer, the first layer adhesively bonded to the first layer.

19. The apparatus according to claim 15, wherein said strata of said seal member are integrally molded regions.

20. The apparatus according to claim 19,
(a) wherein the molded regions define a first region having a hardness between approximately 40 and 60 durometer; and
(b) wherein the molded regions define a second region having a hardness between approximately 60 and 80 durometer, the second region integrally molded with the first region.

21. The apparatus according to claim 19,
(a) wherein the molded regions define a first region having a hardness of approximately 50 durometer; and
(b) wherein the molded regions define a second region having a hardness of approximately 70 durometer, the second region integrally molded with the first region.

22. The apparatus according to claim 16, wherein said seal member is an EPDM.

23. The apparatus according to claim 22, wherein said seal member has "NYLON" fibers homogeneously dispersed therein for resisting extrusion.

24. The apparatus according to claim 16, wherein said seal member is "NYLON" for resisting extrusion.

25. The apparatus according to claim 14, wherein said nozzle dam comprises:
(a) a generally arcuate-shaped first side section;
(b) a generally arcuate-shaped second side section hingedly connected to said first side section by a hinge assembly, said first side section and said second side section capable of being pivoted about the hinge assembly and into a planar configuration; and
(c) a generally rectangular center section removably connected to said first side section and to said second side section for rigidly fixing said first side section and said second side section in the planer configuration.

26. The apparatus according to claim 25, wherein said rectangular center section has arcuate end portions so that said center section, said first side section and said second side section define a generally circular cover plate for covering the generally circular opening of said bracket as said center section fixes said first side section and said second side section in the planer configuration, whereby said first side section and said second side section are capable of being hinged inwardly for passage through the access port and hinged outwardly for placement on the top surface of said bracket.

27. The apparatus according to claim 17,
(a) wherein the top surface of said bracket has a multiplicity of grooves therein; and
(b) wherein said first layer of said seal member intimately engages the grooves in the top surface of said bracket for providing obstructions to fluid flow across said grooves so that said nozzle dam is fluid-tight.

* * * * *